Feb. 15, 1927.

J. A. HEANY

ELECTRIC ARC LAMP

Filed July 15, 1916

1,617,633

Inventor
John Allen Heany
By Vennie Goldsborough & O'Neill
Attys

Patented Feb. 15, 1927.

1,617,633

UNITED STATES PATENT OFFICE.

JOHN ALLEN HEANY, OF NEW YORK, N. Y., ASSIGNOR TO HEANY LABORATORIES, INC., OF NEW HAVEN, CONNECTICUT, A CORPORATION OF CONNECTICUT.

ELECTRIC-ARC LAMP.

Application filed July 15, 1916. Serial No. 109,451.

The invention relates to an electric arc lamp which operates on very low wattages and at the ordinary commercial voltages, either direct or alternating, and will maintain a very high efficiency even with extremely small candle powers. To this end, the invention comprises a lamp involving a container or envelope, preferably adapted for connection in the ordinary incandescent lamp socket, within which are mounted terminals or electrodes, one or both of which comprises a highly refractory compound, such as oxide of thorium, oxide of zirconium, or the like, which possesses, in high degree, the quality of selective radiation, when highly heated, the heating being effected either by means of a refractory metal, such as tungsten, associated with the refractory compound, and which is included in the electric circuit, or by means of a subsidiary heating coil which is adapted to be cut out of circuit when the arc has been established, the arcing electrode being associated with a ballast or regulating resistance which in itself becomes incandescent under the influence of the operating current, the envelope preferably containing an atmosphere of gas which is inert with respect to the incandescing ballast wire, as well as to the metal constituent of the electrode, but which is nevertheless capable of becoming ionized to maintain a relatively long arc between the electrodes when the latter have been initially heated to a degree sufficient to render them capable of maintaining an arc.

In the accompanying drawings.

In arc lights as heretofore constructed and operated, the ballast or stabilizing means generally constituted a dead resistance which represented a loss of energy, which was dissipated in the form of heat. It is necessary, however, to employ stabilizing means in connection with arc lamps of the multiple type, operating upon the ordinary commercial voltages employed for incandescent lighting, and it has been found that the ballast or stabilizing devices consume a relatively large percentage of the energy without producing any useful effect other than the stabilizing of the light. Attempts have been made to utilize this energy to produce additional light. To this end systems have been devised wherein incandescent lamps have been placed in series with arc lamps and grouped around them. In these cases the stabilizing means and consequently the additional light, is outside of the globe enveloping the arc; and, thus, while it provides additional light, does not act to increase the efficiency of the lamp itself. It is one purpose of the present invention to employ stabilizing means within the globe enveloping the arc and to materially increase the efficiency of the lamp by utilizing the energy consumed in the stabilizing means to maintain the ballast wire at bright incandescence. The electrodes for the arc and also the ballast wire are contained within an envelope preferably adapted for connection in the ordinary incandescent lamp socket.

Figure 1:
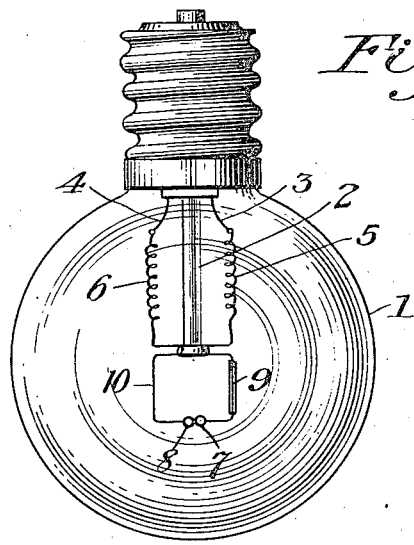
Fig. 1 shows a lamp embodying the invention and adapted to be applied to an ordinary incandescent light socket.

Referring to Fig. 1 of the drawings, 1 indicates an ordinary glass globe or container, provided with the usual form of screw plug common to incandescent electric lamps, which is adapted to screw into the ordinary socket. 3 and 4 represent lead wires, which are connected in the usual manner to the shell and middle terminal of the screw-threaded plug. Connected to the lead wires 3 and 4 are ballast wires 5 and 6 respectively, which are preferably formed of tungsten or tungsten alloy and are made of proper size and length to incandesce when subjected to the current at the voltage for which the lamp is designed. The lower ends of the ballast wires are supported in the end of the anchor rod 2, which is of glass or the like, and to the ends of said ballast wires 5 and 6 are electrically connected a conductor 9, which preferably includes a thermostat which may, if desired, be made of a material which will heat sufficiently during the passage of the current to cause the thermostat to act, and a conductor 10, which latter may be a simple wire. To the ends of the conductors 9 and 10 are secured two terminals or electrodes 7 and 8, in the form of small masses or bodies, comprising a highly refractory compound, which is normally nonconducting, such as thorium oxide, zirconium oxide or mixtures of such oxides, with which is incorporated a conductor of highly refractory metal, such as tungsten, vanadium, titanium, or a very highly refractory alloy, either in the form of a core of fine wire, or as fine particles dispersed throughout the oxide so as to render the electrode conductive at normal temperatures. As indicated, one or both of these electrodes or terminals 7 and 8 may consist of such composite body, and when one only of the terminals is thus constituted, the other is preferably formed of metal or metal alloy.

It is difficult to draw and maintain an arc in vacuo because there is no atmosphere to become ionized and serve as a conducting path for the arc stream. It is well known that the refractory metallic oxides are efficient ionizing agents, and if terminals formed of such oxides are heated to incandescence, an arc may be established and maintained therebetween. As indicated, however, these refractory oxides are nonconductive and in order to render the electrodes made therefrom operative to maintain an arc, it is necessary to heat them to a sufficient temperature which is effected in the case under consideration by incorporating a conductive material therewith, which must necessarily have a very high fusing and melting point, and which incandesces under the influence of the operating current, such for example as tungsten. When a metal of this character, however, is employed, it becomes necessary to surround the arcing electrodes with an atmosphere which is inert to the metal, but which when ionized serves as a conductor for the arc stream. This atmosphere must also be inert to the stabilizing means when the latter constitutes an incandescing filament. It has been found that when the bulb 1 is filled with hydrogen or nitrogen, or similar inert gas and preferably at a reduced pressure, the lamp operates under peculiar and striking conditions of efficiency. When the gaseous atmosphere is maintained under diminished pressure, a larger arc may be established and maintained, due apparently to the cathodic effect.

When the current is turned on in a lamp constructed as shown in Fig. 1, it enters by way of lead wire 3 through the ballast filament 5, thence through the thermostat conductor 9 to electrode 7, which is in surface contact with electrode 8, thence by conductor 10 and ballast filament 6 to lead wire 4, back to the source. Inasmuch as the filaments 5 and 6 are incandescing elements, they are immediately brought to incandescence and emit light in quantity and quality characteristic of the material employed in forming the filament. The heat radiated from the filaments 5 and 6 or developed by the thermostat 9 causes the latter to separate the electrodes 7 and 8 thereby drawing or striking an arc between the electrodes which is maintained steadily and uniformly, the filaments 5 and 6 serving as the necessary ballast or stabilizing means and the thermostat maintaining the electrodes at a proper distance apart. Under these circumstances, practically all of the current is utilized in producing light, inasmuch as the ballast wires 5 and 6 are maintained at bright incandescence by the portion of the current heretofore wasted in the ballast, while a bright, clear and steady arc is maintained between the electrodes 7 and 8, the two sources of light constituting an ideal combination, which may be utilized in any desired candle power, from say 15 candle power up to several hundred, and at a consumption of approximately $\tfrac{5}{10}$ watt per candle.

Figure 2:
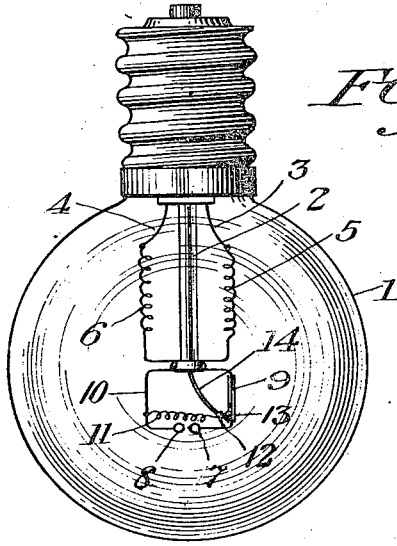
Fig. 2 illustrates a modified form of lamp.

In the modified form of the lamp shown in Fig. 2, the electrodes 7 and 8 may comprise the refractory oxide in combination with a refractory metal, as in the first case, and said electrodes are not necessarily brought into contact, but the material constituting the same is heated to a degree sufficient to cause the oxide constituents thereof to ionize the gas surrounding the electrodes, by means of a heating coil 11, which is connected to one side of the conductor 10 and at the other to thermostatic conductor 9, by means of separable contacts 12 and 13, the former of which is carried by a support 14, which anchors the free end of coil 11 to the glass rod 2. When current is supplied to the lamp, it flows by way of lead wire 3, ballast 5, thermostat 9, contact 13, contact 12, thence by heating coil 11 to conductor 10, ballast 6, lead wire 4, back to the source. The effect of this is to cause the ballast wires 5 and 6 to become brightly incandescent and, at the same time, to heat coil or conductor 11, which in turn heats the electrodes 7 and 8. Preferably the coil 11 is adjusted to the same voltage that is required to maintain the arc between the terminals 7 and 8 when such arc has been established. A short time after the coil 11 becomes heated to incandescence and the heat has been transferred to terminals 7 and 8, ionization takes place between said terminals to form a conductive path for the current, and an arc will be established between said terminals. About this time, the thermostatic conductor 9 responding to the generated heat, will break the circuit of coil 11 between contacts 12 and 13 and move the terminals 7 and 8 farther apart and to the proper arcing distance. The lamp will then operate in the same manner as that shown in Fig. 1. Whenever the arc is extinguished in either of the types, the apparatus will be restored to its initial condition, with the electrodes 7 and 8 in contact, in the first form, and with the contacts 12 and 13 in engagement in the second form, so that if the current is still flowing, the arc will be promptly reestablished in either case.

What I claim is:—

1. An improved arc lamp comprising a container, electrodes at least one of which is formed of highly refractory rare metallic oxide associated with a highly refractory metal which incandesces at the temperature at which platinum volatilizes, means for heating said electrodes, and an atmosphere of inert gas in said container.

2. An improved arc lamp comprising a container, electrodes at least one of which is formed of highly refractory rare metallic oxide associated with a highly refractory metal which incandesces at the temperature at which platinum volatilizes, means for heating said electrodes, and an atmosphere of inert gas under diminished pressure in said container.

3. In an improved arc lamp, comprising a container, electrodes at least one of which includes a highly refractory rare metallic oxide associated with a highly refractory metal which incandesces at the temperature at which platinum volatilizes, and circuit connections for said electrodes including an incandescing and heating filament and a thermostat which maintains said electrodes at proper arcing distance.

4. An improved arc lamp, comprising a container, electrodes at least one of which includes a highly refractory and highly ionizable rare metallic oxide and a highly refractory metal which incandesces at the temperature at which platinum volatilizes, circuit connections for said electrodes including an incandescing and heating filament and a thermostat which maintains said electrodes at proper arcing distance, and an atmosphere of inert gas in said container.

5. An improved arc lamp comprising a container, spaced electrodes at least one of which includes a highly refractory nonmetallic oxide associated with a highly refractory metal which incandesces at the temperature at which platinum volatilizes, circuit connections for said electrodes including an incandescing filament and a thermostat which maintains said electrodes at proper arcing distance, an electric heating element for heating the electrodes, and connections operated by said thermostat for cutting out said heating element simultaneously with the establishment of the arc.

6. An improved arc lamp, comprising a container, spaced electrodes at least one of which includes a highly refractory rare metallic oxide associated with a highly refractory metal which incandesces at the temperature at which platinum volatilizes, circuit connections for said electrodes including an incandescing filament and a thermostat which maintains said electrodes at proper arcing distance, an electric heating element for heating the electrodes, connections operated by said thermostat for cutting out said heating element simultaneously with the establishment of the arc, and an atmosphere of inert gas in said container.

7. An improved arc lamp comprising a container, electrodes, circuit connections for said electrodes including an incandescing and heating filament and a thermostat which maintains said electrodes at proper arcing distance.

8. In an improved arc lamp, a container, electrodes at least one of which includes a highly refractory, rare metallic oxide, circuit connections for said electrodes including a stabilizing element which is rendered incandescent by the arc forming current, a thermostat which maintains the electrodes at proper arcing distance, means for starting the arc and connections operated by said thermostat for cutting out said starting means simultaneously with the establishment of the arc.

9. An improved arc lamp comprising a container, electrodes, circuit connections for said electrodes including an incandescing ballast, a heating element for heating the electrodes and means to maintain said electrodes at proper arcing distance, and connections operated by said means for cutting out said heating element simultaneously with the establishment of the arc.

10. An improved arc lamp, comprising a container, spaced electrodes within said container, circuit connections for the electrodes including a thermostat which maintains said electrodes at proper arcing distance, an electric heating element for heating the electrodes, connections operated by said thermostat for cutting out said heating element simultaneously with the establishment of the arc, and an atmosphere of inert gas in said container.

In testimony whereof I affix my signature.

JOHN ALLEN HEANY.